(12) United States Patent
Chen et al.

(10) Patent No.: US 7,132,878 B2
(45) Date of Patent: Nov. 7, 2006

(54) CHARGE PUMP CURRENT SOURCE

(75) Inventors: Tupei Chen, Singapore (SG);
Chew-Hoe Ang, Singapore (SG);
Shyue-Seng Tan, Singapore (SG);
Jia-Zhen Zheng, Singapore (SG)

(73) Assignee: Chartered Semiconductor Manufacturing Ltd., Singapore (SG)

( * ) Notice: Subject to any disclaimer, the term of this patent is extended or adjusted under 35 U.S.C. 154(b) by 184 days.

(21) Appl. No.: 10/991,591

(22) Filed: Nov. 18, 2004

(65) Prior Publication Data

US 2006/0103450 A1 May 18, 2006

(51) Int. Cl.
*G05F 1/10* (2006.01)
(52) U.S. Cl. .................................. 327/536; 327/566
(58) Field of Classification Search ................ 327/534, 327/535, 536, 537, 564, 565, 566
See application file for complete search history.

(56) References Cited

U.S. PATENT DOCUMENTS

| | | | |
|---|---|---|---|
| 5,561,385 A | 10/1996 | Choi | 327/536 |
| 6,166,585 A * | 12/2000 | Bazzani | 327/536 |
| 6,232,826 B1 * | 5/2001 | Afghahi et al. | 327/536 |
| 6,278,315 B1 | 8/2001 | Kim | 327/536 |
| 6,285,243 B1 | 9/2001 | Mecier et al. | 327/536 |
| 6,323,721 B1 | 11/2001 | Proebsting | 327/535 |
| 6,326,839 B1 | 12/2001 | Proebsting | 327/589 |
| 6,366,519 B1 * | 4/2002 | Hung et al. | 365/226 |
| 6,693,480 B1 * | 2/2004 | Wong | 327/390 |

* cited by examiner

*Primary Examiner*—Jeffrey Zweizig
(74) *Attorney, Agent, or Firm*—Saile Ackerman LLC; Stephen B. Ackerman

(57) ABSTRACT

This invention provides a circuit and a method for generating a low-level current using semiconductor charge pumping. The invention provides a means of generating a range of current sources by varying the frequency of a repetitive voltage pulse input signal. Also, this invention utilizes one or many MOSFET devices in order to produce higher levels of current. The current source embodiments of this invention generate very stable current sources with high input impedances.

40 Claims, 3 Drawing Sheets

CHARGE PUMP CURRENT SOURCE

BACKGROUND OF THE INVENTION

1. Field of the Invention

This invention relates to a circuit and a method for generating a low-level current using semiconductor charge pumping.

More particularly this invention relates to a means of generating a range of current sources by varying the frequency of a repetitive voltage pulse input signal.

Also, this invention relates to utilizing one or many MOSFET devices in order to produce higher levels of current.

In addition, this invention relates to the ability to generate very stable current sources with high input impedances.

2. Description of Related Art

The prior art related to this invention includes various high input impedance low level current sources. Typically, these current sources are custom designed monolithic circuits. They are not modular or are they scalable from the lowest current level produced by a single device to high current levels produced by hundreds of device.

U.S. Pat. No. 6,285,243 B1 (Mercier et al.) "High Voltage Charge Pump Circuit" describes a circuit which transfers a voltage signal in an output stage without signal level degradation. By-pass techniques are used to avoid semiconductor damage or breakdown.

U.S. Pat. No. 6,326,839 B2 (Proebsting) "Apparatus for Translating a Voltage" discloses a low voltage current source is used for translating voltage levels using a charge pumping mechanism.

U.S. Pat. No. 6,323,721 B1 (Proebsting) "Substrate Voltage Detector" discloses low voltage current source circuit, which generates low voltage signals for powering a variable frequency oscillator.

U.S. Pat. No. 5,561,385 (Choi) "Internal Voltage Generator for Semiconductor Device" discloses an internal voltage generator for a semiconductor device, for generating an internal voltage within the device.

U.S. Pat. No. 6,278,315 (Kim) "High Voltage Generating Circuit and Method for Generating a Signal Maintaining High Voltage and Current Characteristics Therewith" discloses a high voltage generating circuit, which is used to generate a high voltage with a high current. This circuit is used for on-chip programming and erasing of electrically erasable programmable read only memory EEPROM or flash memory.

BRIEF SUMMARY OF THE INVENTION

It is the objective of this invention to provide a circuit and a method for generating a low-level current using semiconductor charge pumping.

It is further an object of this invention to provide a means of generating a range of current sources by varying the frequency of a repetitive voltage pulse input signal.

Also, it is further an object of this invention to utilizing one or many MOSFET devices in order to produce higher levels of current.

In addition, it is further an object of this invention to generate very stable current sources with high input impedances.

The objects of this invention are achieved by a frequency-controlled low-level current source based on charge pumping and using a single metal-oxide semiconductor field effect transistor, MOSFET, a voltage pulse generator attached to a gate of the MOSFET, a ground connected to a drain of the MOSFET, a ground connected to a source of the MOSFET, and an output current produced at a substrate terminal of the MOSFET. The frequency-controlled current source of this invention has a MOSFET device whose source region of the MOSFET is made of n+ semiconductor material. The drain of the MOSFET is made of n+ type semiconductor material. The circuit of this invention has a substrate of the MOSFET which is made of p type semiconductor material. The frequency-controlled current source MOSFET has claim 1 wherein a gate which is made of is made of poly-silicon. The current source has a voltage pulse applied to the MOSFET gate by the voltage pulse generator. The frequency-controlled current source's gate voltage pulse causes a charge inversion in to the p type substrate which results in negative charge accumulation in the p-type substrate located between said n+ MOSFET drain and said n+ MOSFET source. This negative charge accumulation is caused by the flow of electrons from the MOSFET source and MOSFET drain where some electrons are trapped in interface states. When the MOSFETgate pulse goes to its low state the mobile electrons, those that are not trapped in the interface states, will return to said MOSFET source and drain. The non-mobile trapped or electrons will recombine with the holes in the p-substrate. The trapped, recombined electrons results in a net flow of negative charge into the substrate. This net flow of negative charge is the resultant charge pump current which is generated by this low-level current source of this invention.

DETAILED DESCRIPTION OF THE INVENTION

Figure 1:
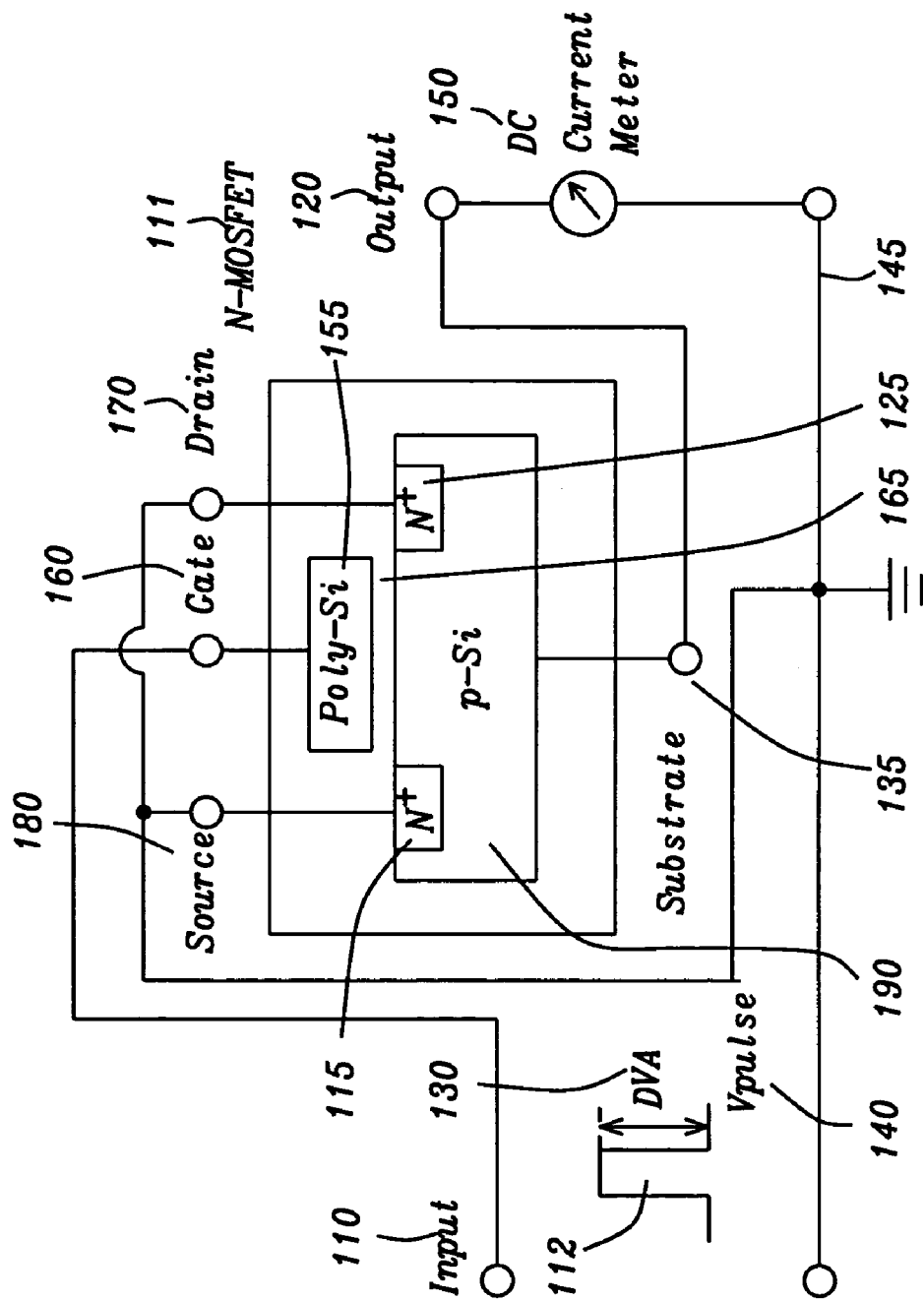
FIG. 1 shows a cross-sectional view of the single MOSFET device embodiment of the current source of this invention.

FIG. 1 shows a cross-sectional view of the main embodiment of this invention. A metal oxide semiconductor field effect transistor MOSFET 111 is shown. The gate 160 is made of poly-silicon. The source 180 is connected to ground 145. The drain 170 is also connected to ground 145. Both the source 115 and drain 125 are made of n+ semiconductor material. The substrate 190 is made of p-type silicon material. The substrate is connected 135 to a DC current meter 150, which is used to test the output current 120 produced by this change pump MOSFET.

The gate 160 is connected to the input line 110. A repetitive voltage pulse signal 112 is applied to the input 110. This pulse signal has a base voltage level Vbase 140 and a voltage amplitude delta equal to delta VA 130.

Charge pumping in MOSFETs is a well-known phenomenon that is related to the recombination process at the SiO2/Si interface 190 involving the interface states as shown in FIG. 1. For a MOSFET with the connections shown in FIG. 1, when the transistor is pulsed into inversion, the p-type silicon surface 190 becomes deeply depleted and electrons will flow from the source 115 and drain 125 regions into the channel 190 where some of them will be captured by the interface states. When the gate pulse 112 is driving the surface back to accumulation, the mobile charges flow back to the source 115 and drain 125 but the charges trapped in the interface states will recombine with the majority carriers (i.e. holes for p-Si substrate) from the substrate 190 and give rise to a net flow of negative charge into the substrate 135. The charge Qss which will recombine is given by $$Qss=(q*2) S\ D\ P$$

Where (q*2) is the electron charge squared in coulombs squared, S is the channel area of the MOSFET (cm2), D it is the mean interface state density over the energy range swept through by the Fermi level and P is the total sweep of the surface potential. When applying repetitive pulses to the gate with frequency, f, this charge Qss will give rise to a steady-state current in the substrate 135. This current 150 is the so-called charge pumping current, and it is given by $$Icp=f\ Qss=f(q*2)S\ D\ P$$

where f is the frequency of the repetitive input gate voltage signal.

Figure 2:
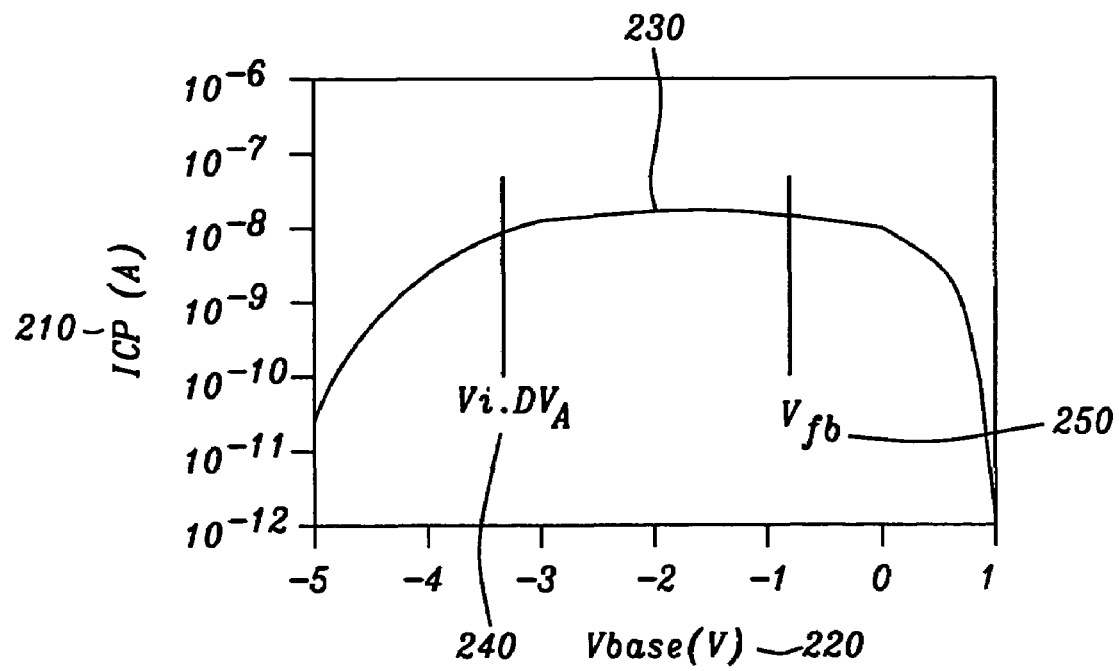
FIG. 2 shows a plot of charge pump output current vs. the Vbase voltage of the input voltage pulse applied to the gate of the MOSFET device.

The charge pumping current can be observed with different pulse shapes (square, triangle or other pulse shapes). For square pulses, if the amplitude of the pulses is kept constant but the pulse base level Vbase is varied from inversion to accumulation, the charge pumping current 210 will vary with the Vbase 220 is shown in FIG. 2. In the saturation region 230 with Vt−dVa<Vbase<Vfb 240, 250, where Vt, dVa and Vfb represent the threshold voltage, the pulse amplitude, and the flat band voltage, respectively, the charge pumping current is a constant 230 and is determined by the Icp equation (2) above.

Figure 3:
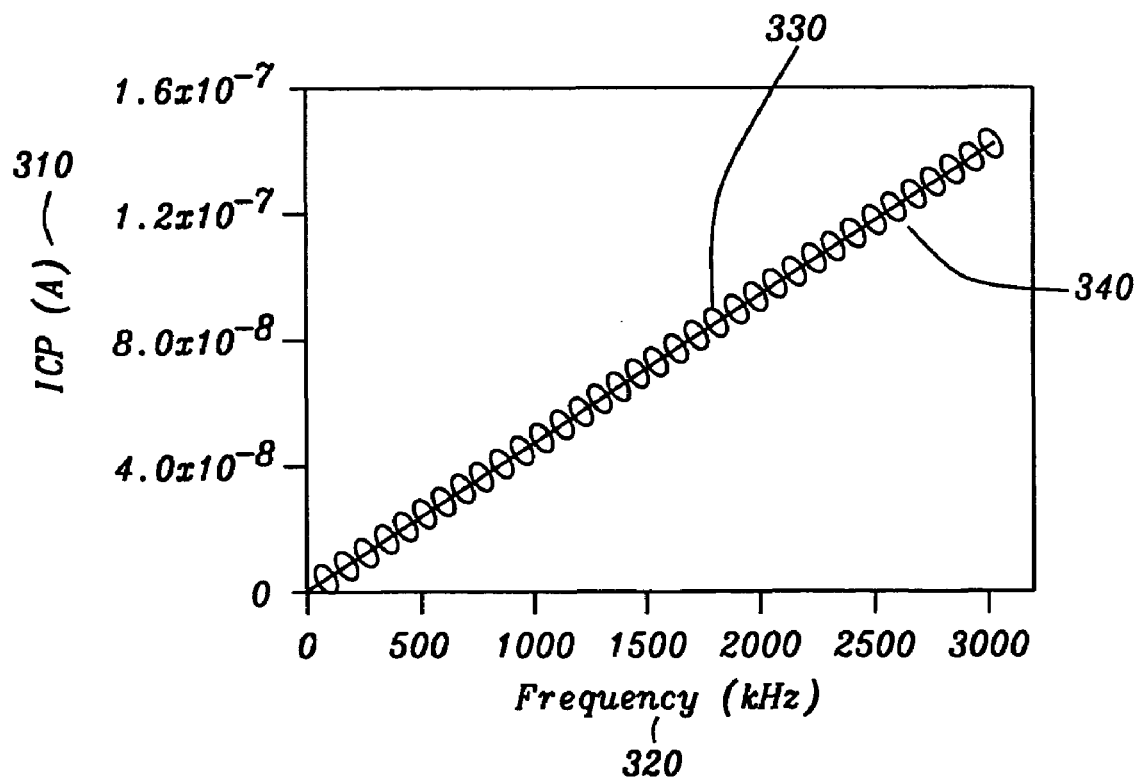
FIG. 3 contains a plot of charge pump output current vs. frequency of the gate input repetitive pulse voltage applied.

The current source of this invention has its output current 310 proportional to the frequency 320 input pulses. The frequency 330 dependence of the charge pumping current at different V base within the saturation region is shown in FIG. 3. A good linear frequency dependence was observed up to the frequency of 2.5 MHz (at higher frequencies 340 there was a slight departure because those "slower" interface states were not able to response quickly enough). The charge pumping current can serve as a low-level DC current source (for example a DC current 0.1 uA). As the charge pumping current is proportional to the frequency of the input pulses, the output current can be easily controlled through the frequency.

Another feature of the current source of this invention is that it is insensitive to the drift of pulse voltage. As can be seen in FIG. 2, the charge pumping current was essentially independent of the Vbase in the saturation region 230. If the pulse base level is within the saturation region, then the output current will be insensitive to a small drift of the pulse base level or top level. It is possible to have a desired saturation region through a proper selection of the values of the Vt, the Vfb and the dVa. The Vt and the Vfb depend on the substrate doping, gate materials, the fixed charges in the gate oxide, as well as the thickness of the gate oxide, and they can be controlled during the device manufacturing. To maintain a constant level of interface state, the pulse base level as well as the top level must be below the threshold voltage for the Fowler-Nordheim tunneling (7V for a 50 A thick gate oxide).

The current source circuit of this invention has an extremely high input resistance, as the gate oxide is an excellent isolator, the charge pumping current source will have an extremely high input resistance.

Figure 4:
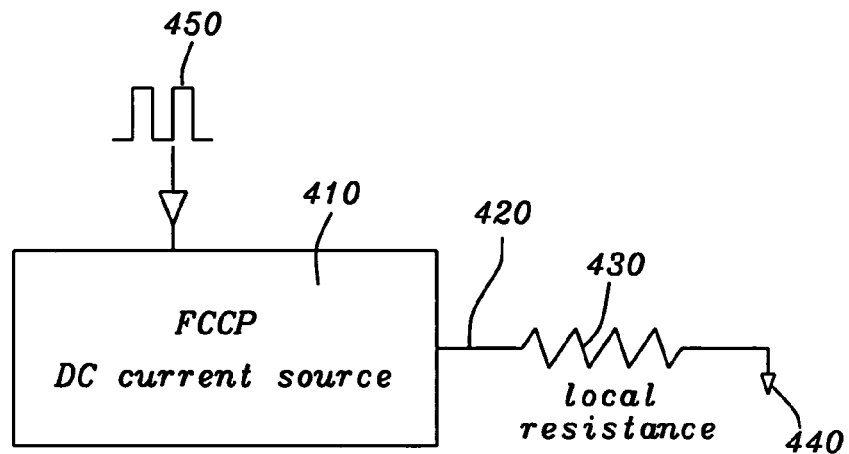
FIG. 4 shows the system level connection of the single MOSFET device current source of this invention.
Figure 5:
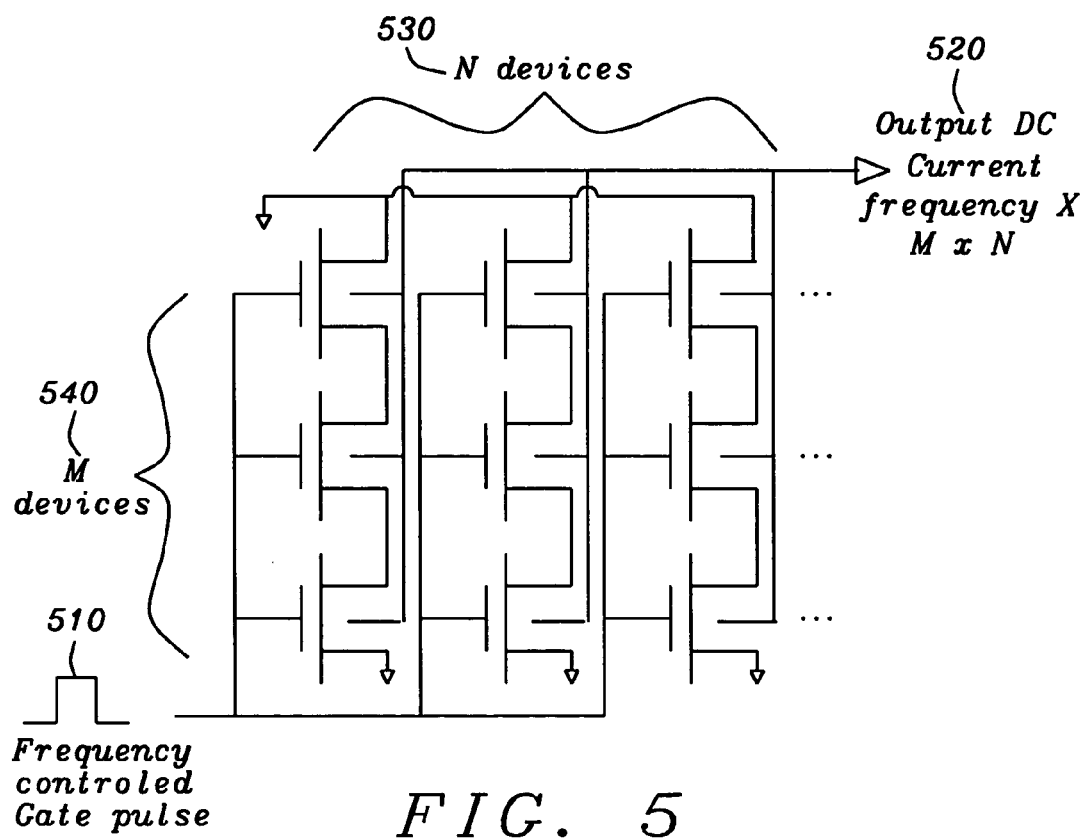
FIG. 5 shows the multi-MOSFET device embodiment of this invention.

As can be seen in FIG. 4, for low-level output current with current less than 0.1 uA, the frequency-controlled charge-pumping (FCCP) DC current source 410 can be fabricated using a single transistor, with the resistive load 430 connected in series with the substrate terminal 420 of the transistor. As is illustrated in FIG. 5, if higher output current is desired, a two-dimensional array 530, 540 of FCCP can be made up of hundreds of transistors. All of the gate terminals are tied together and connected to a single pulse generator 510. The output current 520 is the linear sum of the charge-pumping currents contributed from all of the substrate terminals.

The advantage of this invention is the possibility of creating a range of low-level current sources. The range goes from a single MOSFET device to an array of MOSFET devices connected in parallel to create a higher level of current. In addition, the stability of the current source with respect to variations in the drift of the input pulse voltage is an important advantage. In addition, another advantage is the ability to control the output current by varying the frequency of the input pulse signal. The high input resistance of this current source is also an important feature of this invention.

While this invention has been particularly shown and described with Reference to the preferred embodiments thereof, it will be understood by those Skilled in the art that various changes in form and details may be made without Departing from the spirit and scope of this invention.

What is claimed is:

1. A frequency-controlled low-level current source based on charge pumping comprising:
   a single metal-oxide semiconductor field effect transistor, MOSFET,
   a voltage pulse generator attached to a gate of said MOSFET,
   a ground connected to a drain of said MOSFET,
   said ground connected to a source of said MOSFET, and
   an output current produced at a substrate terminal of said MOSFET.

2. The frequency-controlled current source of claim 1 wherein said source region of said MOSFET is made of n+ semiconductor material.

3. The frequency-controlled current source of claim 1 wherein said drain of said MOSFET is made of n+ type semiconductor material.

4. The frequency-controlled current source of claim 1 wherein said substrate of said MOSFET is made of p type semiconductor material.

5. The frequency-controlled current source of claim 1 wherein said gate of said MOSFET is made of poly-silicon.

6. The frequency-controlled current source of claim 1 wherein a voltage pulse applied to said MOSFET gate by said voltage pulse generator.

7. The frequency-controlled current source of claim 1 wherein said voltage pulse applied to said MOSFET gate causes a charge inversion in said p type substrate which results in negative charge accumulation in the p-type substrate located between said n+ MOSFET drain and said n+ MOSFET source.

8. The frequency-controlled current source of claim 1 wherein said negative charge accumulation is caused by the flow of electrons from said MOSFET source and MOSFET drain where some electrons are trapped in interface states.

9. The frequency-controlled current source of claim 1 wherein when said MOSFETgate pulse goes to its low state the mobile electrons, those that are not trapped in the interface states, will return to said MOSFET source and drain.

10. The frequency-controlled current source of claim 1 wherein said non-mobile trapped or electrons will recombine with the holes in the p-substrate.

11. The frequency-controlled current source of claim 1 wherein said trapped, recombined electrons results in a net flow of negative charge into the substrate.

12. The frequency-controlled current source of claim 1 wherein said net flow of negative charge is given by:

$$Qss=(q*2)S\,D\,P$$

where (q*2) is the electron charge squared in coulombs squared, S is the channel area of the MOSFET (cm2), D it is the mean interface state density over the energy range swept through by the Fermi level and P is the total sweep of the surface potential.

13. The frequency-controlled current source of claim 1 further comprising:
a charge pump current output whose current Icp is given by $$Icp=f\,Qss=f(q*2)S\,D\,P$$

where f is the frequency of the repetitive input gate voltage signal and where (q*2) is the electron charge squared in coulombs squared, S is the channel area of the MOSFET (cm2), D it is the mean interface state density over the energy range swept through by the Fermi level and P is the total sweep of the surface potential.

14. The frequency-controlled current source of claim 1 wherein when said MOSFET is operated in its saturation region; said output charge pumping current is constant and equal to $$Icp=f\,Qss=f(q*2)S\,D\,P$$

where f is the frequency of the repetitive input gate voltage signal and where (q*2) is the electron charge squared in coulombs squared, S is the channel area of the MOSFET (cm2), D it is the mean interface state density over the energy range swept through by the Fermi level and P is the total sweep of the surface potential.

15. The frequency-controlled current source of claim 14 wherein said constant charge pumping current allows said charge pump current source to be insensitive to drift of said pulse voltage.

16. The frequency-controlled current source of claim 14 wherein said MOSFET saturation region is determined by Vt, the MOSFET threshold voltage, Vfb, the MOSFET flatband voltage and dVa, the pulse amplitude, wherein Vt and Vfb are determined by substrate doping, gate material, fixed charges in gate oxide and gate oxide thickness.

17. The frequency-controlled current source of claim 1 wherein it is required that the pulse voltage remains below the threshold voltage for Fowler-Nordheim tunneling.

18. The frequency-controlled current source of claim 1 wherein said current source output current is proportional to said frequency of said input pulse.

19. The frequency-controlled current source of claim 1 wherein said charge pump current source has an extremely high input resistance due to the isolation and low leakage provided by said MOSFET gate oxide.

20. A frequency-controlled higher-level current source comprising:
a two-dimensional array of frequency-controlled low level charge pumping current sources, each of which is comprised of;
a single metal-oxide semiconductor field effect transistor, MOSFET,
a voltage pulse generator attached to a gate of said MOSFET,
a ground connected to a drain of said MOSFET,
said ground connected to a source of said MOSFET, and
an output current produced at a substrate terminal of said MOSFET.

21. The higher-level current frequency-controlled current source of claim 20 wherein said two-dimensional array of MOSFETs has all of said MOSFET gate terminals tied together and connected to a single voltage pulse generator.

22. The higher-level current frequency-controlled current source of claim 21 wherein said two-dimensional array has said MOSFET substrate output current which is a linear sum of said charge pumping currents contributed from all said substrate terminals of said two-dimensional array.

23. A method of producing a frequency-controlled low-level current source based on charge pumping comprising the steps of:
including a single metal-oxide semiconductor field effect transistor, MOSFET,
including a voltage pulse generator attached to a gate of said MOSFET,
including a ground connected to a drain of said MOSFET,
including said ground connected to a source of said MOSFET, and
including an output current produced at a substrate terminal of said MOSFET.

24. The method of producing a frequency-controlled low-level current source based on charge pumping of claim 23 wherein a voltage pulse applied to said MOSFET gate by said voltage pulse generator.

25. The method of producing a frequency-controlled low-level current source based on charge pumping of claim 23 wherein said voltage pulse applied to said MOSFET gate causes a charge inversion in said p type substrate which results in negative charge accumulation in the p-type substrate located between said n+ MOSFET drain and said n+ MOSFET source.

26. The method of producing a frequency-controlled low-level current source based on charge pumping of claim 23 wherein said negative charge accumulation is caused by the flow of electrons from said MOSFET source and MOSFET drain where some electrons are trapped in interface states.

27. The method of producing a frequency-controlled low-level current source based on charge pumping of claim 23 wherein when said MOSFETgate pulse goes to its low state the mobile electrons, those that are not trapped in the interface states, will return to said MOSFET source and drain.

28. The method of producing a frequency-controlled low-level current source based on charge pumping of claim 23 wherein said non-mobile trapped or electrons will recombine with the holes in the p-substrate.

29. The method of producing a frequency-controlled low-level current source based on charge pumping of claim 23 wherein said trapped, recombined electrons results in a net flow of negative charge into the substrate.

30. The method of producing a frequency-controlled low-level current source based on charge pumping of claim 23 wherein said net flow of negative charge is given by:

$$Qss=(q*2)S\,D\,P$$

where (q*2) is the electron charge squared in coulombs squared, S is the channel area of the MOSFET (cm2), D it is the mean interface state density over the energy range swept through by the Fermi level and P is the total sweep of the surface potential.

31. The method of producing a frequency-controlled low-level current source based on charge pumping of claim 23 further comprising:
a charge pump current output whose current Icp is given by $$Icp = f\, Qss = f(q^{*}2)S\, D\, P$$

where f is the frequency of the repetitive input gate voltage signal and where (q*2) is the electron charge squared in coulombs squared, S is the channel area of the MOSFET (cm2), D it is the mean interface state density over the energy range swept through by the Fermi level and P is the total sweep of the surface potential.

32. The method of producing a frequency-controlled low-level current source based on charge pumping of claim 23 wherein when said MOSFET is operated in its saturation region, said output charge pumping current is constant and equal to $$Icp = f\, Qss = f(q^{*}2)S\, D\, P$$

where f is the frequency of the repetitive input gate voltage signal and where (q*2) is the electron charge squared in coulombs squared, S is the channel area of the MOSFET (cm2), D it is the mean interface state density over the energy range swept through by the Fermi level and P is the total sweep of the surface potential.

33. The method of producing a frequency-controlled low-level current source based on charge pumping of claim 32 wherein said constant charge pumping current allows said charge pump current source to be insensitive to drift of said pulse voltage.

34. The method of producing a frequency-controlled low-level current source based on charge pumping of claim 32 wherein said MOSFET saturation region is determined by Vt, the MOSFET threshold voltage, Vfb, the MOSFET flatband voltage and dVa, the pulse amplitude, wherein Vt and Vfb are determined by substrate doping, gate material, fixed charges in gate oxide and gate oxide thickness.

35. The method of producing a frequency-controlled low-level current source based on charge pumping of claim 23 wherein it is required that the pulse voltage remain below the threshold voltage for Fowler-Nordheim tunneling.

36. The method of producing a frequency-controlled low-level current source based on charge pumping of claim 23 wherein said current source output current is proportional to said frequency of said input pulse.

37. The method of producing a frequency-controlled low-level current source based on charge pumping of claim 23 wherein said charge pump current source has an extremely high input resistance due to the isolation and low leakage provided by said MOSFET gate oxide.

38. A method of producing a higher-current level frequency-controlled current source based on charge pumping comprising the steps of:
including a two-dimensional array of frequency-controlled low level charge pumping current sources, each of which is comprised of;
a single metal-oxide semiconductor field effect transistor, MOSFET,
a voltage pulse generator attached to a gate of said MOSFET,
a ground connected to a drain of said MOSFET,
said ground connected to a source of said MOSFET, and
an output current produced at a substrate terminal of said MOSFET.

39. The method of producing a higher-current level frequency-controlled current source based on charge pumping of claim 38 wherein said two-dimensional array of MOSFETs has all of said MOSFET gate terminals tied together and connected to a single voltage pulse generator.

40. The method of producing a higher-current level frequency-controlled current source based on charge pumping of claim 38 wherein said two-dimensional array has said MOSFET substrate output current which is a linear sum of said charge pumping currents contributed from all said substrate terminals of said two-dimensional array.

* * * * *